July 19, 1927.

F. C. MORRIS 1,636,528

BUSHING FOR STEERING COLUMNS

Filed Oct. 11, 1922

INVENTOR
Fred C. Morris.
BY
Carlos P. Griffin
ATTORNEY.

Patented July 19, 1927.

1,636,528

UNITED STATES PATENT OFFICE.

FRED C. MORRIS, OF SAN FRANCISCO, CALIFORNIA.

BUSHING FOR STEERING COLUMNS.

Application filed October 11, 1922. Serial No. 593,863.

This invention relates to a rubber covered metal bushing, the object of which is to provide means to prevent end play and rattling in the main shaft of the steering apparatus of an automobile.

It will be understood by those skilled in the art that the steering wheel of an automobile is secured to a tubular shaft, which shaft passes through a tube commonly known as the steering column.

This steering column is ordinarily fastened to some rigid part of the automobile and contains a bushing of one kind or another in which the shaft to which the steering wheel is connected rotates.

It is difficult to prevent this shaft from rattling because of the wear on the bushing through which it passes, and it is difficult to prevent it from having more or less end play at the top, which condition, however, is relieved by the application of this bushing.

Another object of this invention is to provide a rubber cover for the wearing part of the bushing which will enable the shaft to be held without rattling by compressing the ends of the rubber covering against the shaft and forcing it tightly into the tube or bearing carrying it.

Other objects of the invention will appear as the description proceeds.

An embodiment of the invention is shown in the accompanying drawings, in which the same reference numeral is applied to the same portion throughout, but I am aware that there may be modifications thereof.

Figure 1:
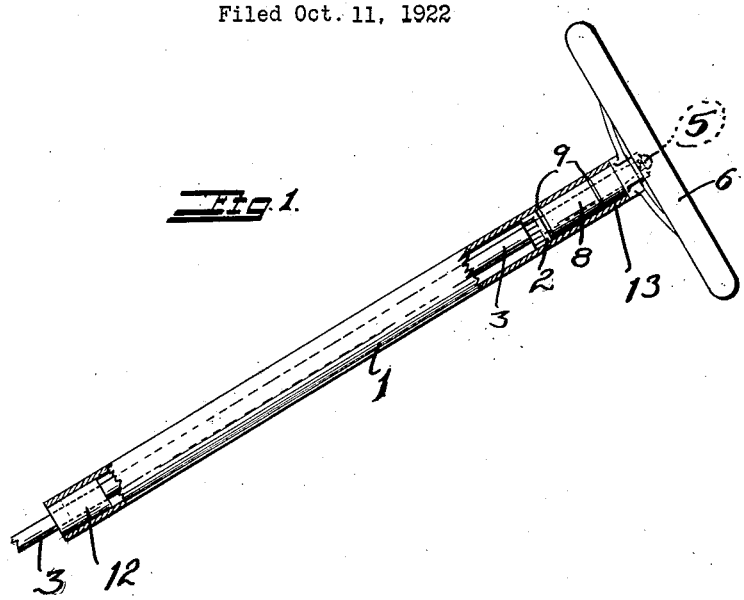
Fig. 1 is a side elevation of a steering column, with portions thereof broken away for the purposes of illustration, showing the application of one of these bushings at the top of the steering column, and another at the bottom.
Figure 2:
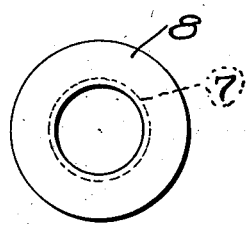
Fig. 2 is an end view of the bushing.
Figure 3:
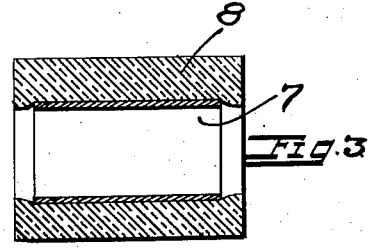
Fig. 3 is a longitudinal sectional view of the apparatus.
Figure 4:
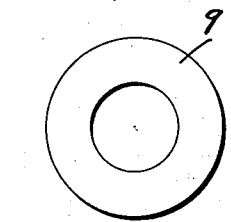
Fig. 4 is a plan view of the washer used in connection therewith.
Figure 5:
Fig. 5 is an edge view of one of said washers.

The steering column consists of a suitably heavy tube 1. This tube ordinarily has a metallic bearing 2 placed at its upper end to hold the steering shaft 3 in the proper place.

The nut 5 secures the steering wheel 6 to the upper end of the shaft 3.

With the present invention a metal tube 7 is provided. This tube is completely covered with a body of solid rubber, made of a specially elastic and oil resisting material, and in connection with the bushing used at the top of the steering column 2, washers, like washers shown at 9, which consist of two flat metallic plates, with a hole therein to receive the shaft 3, are used.

One of the rubber bushings is forced into the lower end of the tube 1, as shown at 12, and the shaft 3 is then pushed through it.

When this bushing is applied to cars in use the steering column is ordinarily not taken out of the car, but the steering wheel is simply removed and the bearing 2 is forced down low enough in the steering column to receive the bushing 8, two of the washers and the hub 13 of the steering wheel.

Since the shaft 3 and tube 1 are fixed by the steering apparatus in a given position with respect to each other, all of the slack movement is taken up at the top by pushing the bearing down so that when the nut 5 is applied to the shaft 3 the two washers 9 will bear upon the rubber bushing with sufficient force to spread it tightly against the inside of the tube 1, this action not only taking up any play of the shaft 3, but also insuring against rattling of all of the parts connected with the upper end of the steering mechanism.

If the bushing is installed in steering column at the factory, it will be of course, unnecessary to use the bearing 2 because the tube 7 is sufficiently heavy to withstand all the wear given it by the rotation of the shaft 3.

In the event that the bushing or the washers 9 wear loose after considerable use, all that is necessary to tighten them up is to take off the steering wheel and add another washer 9 on top of the bushing, whereupon the bushing will be again spread out when the steering wheel nut 5 is screwed into place.

The outer tube of the steering gear assembly is ordinarily known in the automobile industry as the "mass-jacket," and this bushing is technically known as a "mass-jacket bushing."

What I claim is as follows, but various modifications may be made in the construction shown in the drawings and above particularly described form, within the purview of my invention.

1. An anti-rattling bushing for shafts comprising a tubular metal shaft bearing and a rubber covering therefor, said rubber covering projecting beyond the ends of the tube whereby the rubber may be compressed against the shaft to prevent rattling.

2. In a steering gear the combination with a stationary tubular column and a revoluble stem therein of a metal bushing forming a bearing for said stem, said bearing being covered on the outside and ends with a rubber body to hold it in a given place in said stationary column.

3. A device of the class described comprising the combination with a stationary tubular column and a rotatable stem therein of a metal bushing forming a bearing for said rotatable stem, said bushing having a rubber covering for its ends and its side, the rubber engaging the rotatable stem at the ends of the metal bushing.

4. A device of the class described comprising the combination with a stationary tubular column and a rotatable stem therein of a bushing forming a bearing for said rotatable stem within the column, said bushing being supported in a fixed position within the tubular column by a resilient and yieldable material covering the sides and ends of said bushing.

In testimony whereof I have hereunto set my hand this 2nd day of October, A. D., 1922.

FRED C. MORRIS.